July 16, 1929.  J. C. HOLDEN ET AL  1,720,957
STORAGE BATTERY
Filed Jan. 14, 1928  2 Sheets-Sheet 1

WITNESSES

Inventor
JAMES C. HOLDEN
CHESTER COLLIFLOWER

By Irving L. McCathran
Attorney

July 16, 1929.　　J. C. HOLDEN ET AL　　1,720,957
STORAGE BATTERY
Filed Jan. 14, 1928　　2 Sheets-Sheet 2
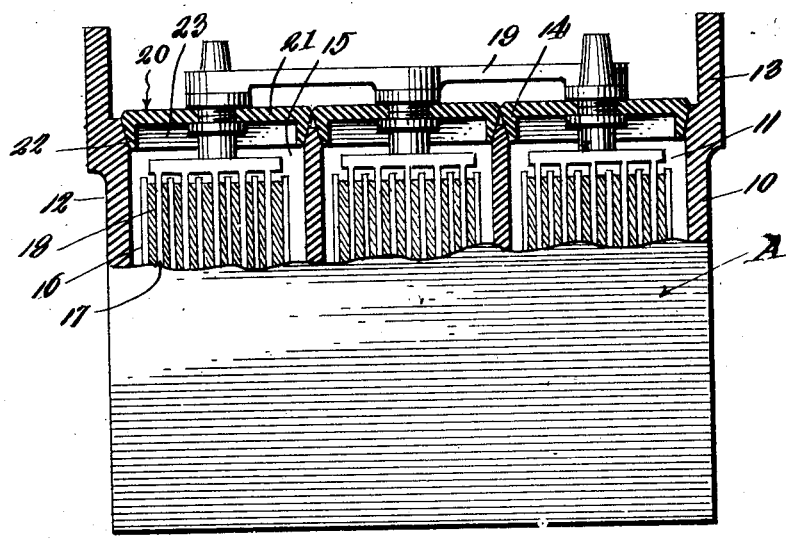
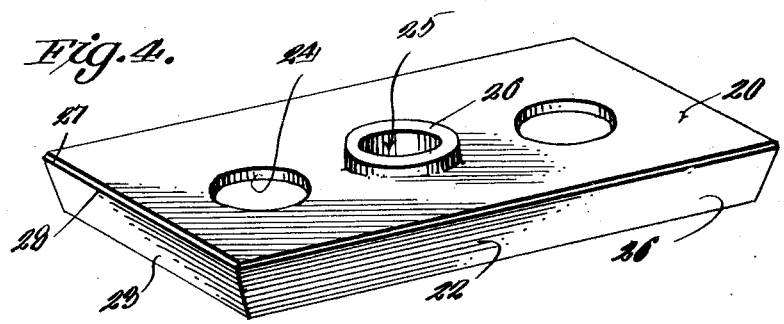
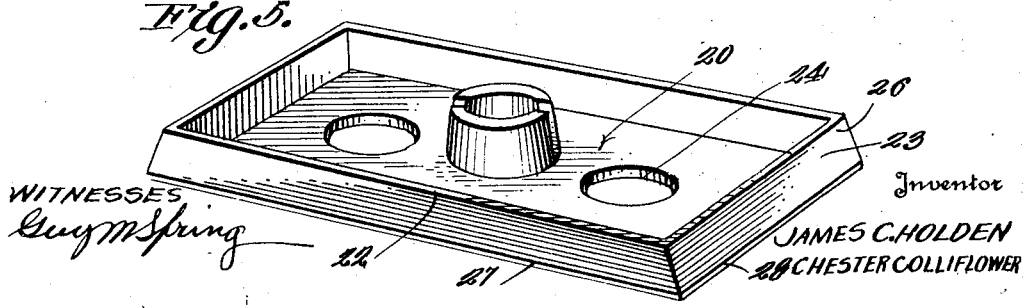

Patented July 16, 1929.

1,720,957

UNITED STATES PATENT OFFICE.

JAMES C. HOLDEN AND CHESTER COLLIFLOWER, OF TERRE HAUTE, INDIANA.

STORAGE BATTERY.

Application filed January 14, 1928. Serial No. 246,784.

This invention appertains to storage batteries and more particularly to a novel cover for the battery case or jars.

One of the primary objects of the present invention is to provide a novel cover for storage battery boxes or cells so constructed as to be wedged in position into the casing, box or cell, for effectively sealing the jars or cells without the necessity of utilizing a sealing compound as is now necessary with the usual type of jar covers.

Another object of the invention is to provide a self sealing battery box or jar cover having beveled sides adapted to be pressed down into the open end of the jar or box forming a friction joint therewith, which makes the box or jar both air and fluid tight.

In the manufacture of storage batteries, an entire unit in the factory is utilized for handling the sealing compound and for applying this compound to the jar covers.

It is therefore a further object of the invention to provide a cover which will interlock with the battery casing or cell jar and eliminate the sealing compound thereby making it unnecessary to provide a unit in the manufacturing plant for this purpose and also cutting down on the fire hazards.

A further object of the invention is the provision of a novel self sealing battery jar cover for interlocking engagement with the jar and which will cooperate in a plural cell battery for strengthening the entire battery case and cells.

A still further object of the invention is to provide a battery cell jar or cover of the above character, which will be durable and efficient in use, one that will be simple and easy to manufacture and one which can be placed upon the mark and incorporated with a conventional battery at a very low cost.

With these and other objects in view, the invention consists in the novel construction, arrangement and formation of parts, as will be hereinafter more specifically described, claimed, and illustrated in the accompanying drawing, in which drawing:

Figure 3 is a longitudinal section taken on the line 3—3 of Figure 1 looking in the direction of the arrows;

Figure 4 is a detailed perspective view of one of the novel covers, and

Figure 5 is a view similar to Figure 4 showing the bottom of the cover.

Figure 1:
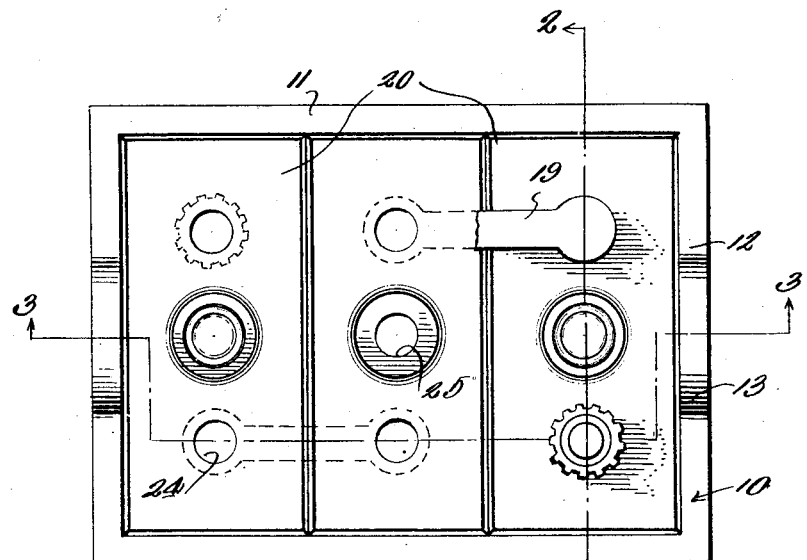
Figure 1 is a top plan view of a storage battery showing the novel covers in use.
Figure 2:
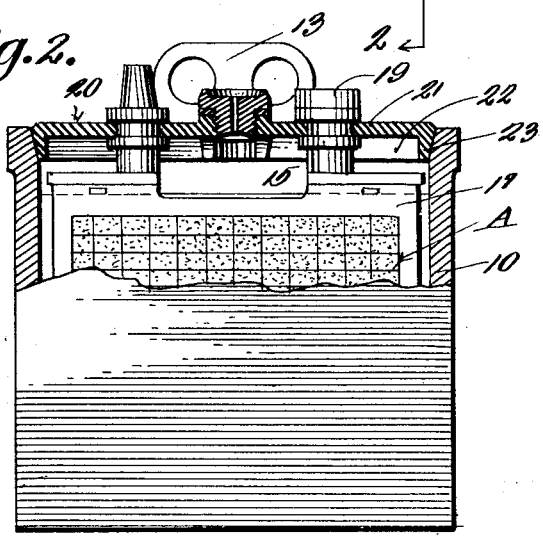
Figure 2 is a transverse section taken on the line 2—2 of Figure 1 looking in the direction of the arrows.

Referring to the drawings in detail, wherein similar reference characters designate correspondence parts throughout the several views, the letter A generally indicates a complete storage battery which comprises a battery box or casing 10 which can be formed of any desired material, such as rubber or rubber composition. This box or casing includes the side walls 11 and the end walls 12, which in the present instance are provided with handles 13. The box or casing 10 is provided with equi-distantly spaced transversely extending partition walls 14 which form a plurality of independent cell compartments 15.

Each cell has arranged therein the usual positive and negative plates as indicated by the reference characters 16 and 17 and a separator 18. An eleven plate cell has been shown, but it is to be understood that any number of plates can be used and that the same forms no part of the present invention. The plates are provided with the usual terminals, but can be connected together by ordinary straps 19, the end cells having the opposite positive and negative posts for the reception of lead wires.

Covers 20 are provided for the cells and these covers form the salient feature of the invention. While we have shown the covers 20 associated with a battery having the cells formed directly in the battery case, it is to be understood that independent cell jars can be used and inserted in a suitable protecting box or casing. Thus the invention resides in the novel formation of the covers and the combination of the covers relative to one another and to the battery box, cell jars or the like, as will be hereinafter pointed out. The covers 20 are preferably made from rubber or a composition of rubber and each includes a flat rectangular shaped top wall 21 and depending side and end walls or flanges 22 and 23. The top wall 21 is provided with side openings 24 through which the posts of the cells are adapted to protrude, and a central opening 25 for permitting the introduction of electrolyte in the cells. The opening 25 can be provided with any desired type of integral sleeve or hollow boss 26.

The formation of the end walls 23 and the side walls 22 is important to the present invention and it is to be noted that these walls are beveled inwardly and downwardly as indicated by the reference character 26. The beveled portions of these walls constitute the major part thereof, but the extreme upper outer edge of the cover is beveled upwardly and inwardly as indicated by the reference character 27 which defines a substantially sharp shoulder or edge 28 at the meeting point of the beveled portions 26 and 27.

In use of the improved covers, the same are forced directly into the cells and the beveled faces of the walls 22 and 23 permit this forcible insertion into the cells and the covers function similar to a stopper or cork. Thus a liquid and air tight connection is had between the walls of the cells and the cover, entirely eliminating the necessity of using sealing compounds or the like. The change of temperature in the cells, casing or covers will have no effect on the closure made and the possibility of electrolyte seeping past the covers is entirely eliminated.

The covers being formed of the material specified and forced into the cells as described and shown, cooperate one with the other to form a rigid top and the covers cooperating with one another to brace the cells at the weakest point thereof, as the forcing of the covers in each of the cells has a tendency to force the walls of the cells toward the covers.

Further, the edges 28 are adapted to engage one another when all of the covers of the cells are in position, thus forming a secondary lock.

From the foregoing description, it can be seen that we have provided a novel cover for storage battery cells, jars or boxes which will be self locking and form an efficient brace for the upper end of the cells.

Changes in details may be made without departing from the spirit or the scope of this invention, but what we claim as new is:

A battery cell cover comprising a flat top wall and depending side and end walls, the outer faces of said side and end walls being beveled inwardly and downwardly for engaging the walls of a cell defining a primary sealing means, the extreme upper marginal edge of the top wall being beveled upwardly and inwardly and defining in connection with the beveled side and end walls, a marginal shoulder for engagement with the adjacent edges of jar covers forming a secondary sealing lock.

In testimony whereof we affix our signatures.

JAMES C. HOLDEN.
CHESTER COLLIFLOWER.